US009256518B2

(12) United States Patent
Boden et al.

(10) Patent No.: US 9,256,518 B2
(45) Date of Patent: Feb. 9, 2016

(54) AUTOMATED DATA COLLECTION, COMPUTATION AND REPORTING OF CONTENT SPACE COVERAGE METRICS FOR SOFTWARE PRODUCTS

(71) Applicant: International Business Machines Corporation, Armonk, NY (US)

(72) Inventors: Edward Boden, Highland, NY (US); Robert C. Hansen, Endicott, NY (US); Anthony F. Pioli, Benford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/501,103

(22) Filed: Sep. 30, 2014

(65) Prior Publication Data

US 2015/0020054 A1     Jan. 15, 2015

Related U.S. Application Data

(63) Continuation of application No. 13/741,791, filed on Jan. 15, 2013.

(51) Int. Cl.

| | |
|---|---|
| *G06F 7/00* | (2006.01) |
| *G06F 17/30* | (2006.01) |
| *G06F 15/16* | (2006.01) |
| *G06F 21/00* | (2013.01) |
| *G06F 9/44* | (2006.01) |
| *G06F 3/00* | (2006.01) |
| *G06F 13/00* | (2006.01) |
| *G06F 9/46* | (2006.01) |
| *G06F 11/36* | (2006.01) |

(52) U.S. Cl.
CPC ........ *G06F 11/3676* (2013.01); *G06F 11/3692* (2013.01)

(58) Field of Classification Search
CPC . G06F 17/3079; G06F 17/30247; G06F 8/10; G06F 8/70; G06F 11/3676; G06F 11/3692
See application file for complete search history.

(56) References Cited

U.S. PATENT DOCUMENTS

| | | | |
|---|---|---|---|
| 5,617,568 | A | 4/1997 | Ault et al. |
| 6,342,907 | B1 | 1/2002 | Petty et al. |
| 6,367,077 | B1 | 4/2002 | Brodersen et al. |

(Continued)

FOREIGN PATENT DOCUMENTS

| | | |
|---|---|---|
| CA | 2680978 A1 | 4/2010 |
| WO | 2011031328 A2 | 3/2011 |

OTHER PUBLICATIONS

Achim D. Brucker et al., "HOL-TestGen An Interactive Test-case Generation Framework,"; M. Chechik and M. Wirsing (Eds.): FASE 2009, LNCS 5503, pp. 417-420, 2009.

(Continued)

*Primary Examiner* — Don Wong
*Assistant Examiner* — Anibal Rivera
(74) *Attorney, Agent, or Firm* — Cantor Colburn LLP; William A. Kinnaman, Jr.

(57) ABSTRACT

One or more test results and one or more user stories are received. For each test result in the one or more test results a set of content space coordinates of the one or more test results is compared to a set of content space coordinates of the one or more user stories. Based on the comparison it is determined if one or more user stories have been tested. One or more results of the comparison are then stored.

12 Claims, 3 Drawing Sheets

(56) References Cited

U.S. PATENT DOCUMENTS

| | | |
|---|---|---|
| 6,536,036 B1 | 3/2003 | Pavela |
| 6,799,718 B2 | 10/2004 | Chan et al. |
| 6,910,041 B2 | 6/2005 | Exton et al. |
| 7,000,184 B2 | 2/2006 | Matveyenko et al. |
| 7,127,707 B1 | 10/2006 | Mishra et al. |
| 7,139,737 B2 | 11/2006 | Takahashi et al. |
| 7,149,699 B2 | 12/2006 | Barnard et al. |
| 7,210,066 B2 | 4/2007 | Mandava et al. |
| 7,272,752 B2 | 9/2007 | Farchi et al. |
| 7,467,198 B2 | 12/2008 | Goodman et al. |
| 7,467,202 B2 | 12/2008 | Savchuk |
| 7,503,037 B2 | 3/2009 | Banerjee et al. |
| 7,509,626 B1 | 3/2009 | Barnes et al. |
| 7,512,957 B2 | 3/2009 | Cohen et al. |
| 7,530,057 B2 | 5/2009 | Babcock |
| 7,555,742 B2 | 6/2009 | Iborra et al. |
| 7,562,338 B2 | 7/2009 | Knutson et al. |
| 7,581,205 B1 | 8/2009 | Massoudi |
| 7,587,636 B2 | 9/2009 | Tillmann et al. |
| 7,752,606 B2 | 7/2010 | Savage |
| 7,761,591 B2 | 7/2010 | Graham |
| 7,778,899 B2 | 8/2010 | Scumniotales et al. |
| 7,861,178 B2 | 12/2010 | Lui et al. |
| 7,904,890 B1 | 3/2011 | Hsieh et al. |
| 7,979,796 B2 | 7/2011 | Williams et al. |
| 8,006,222 B2 | 8/2011 | Ruhe |
| 8,032,860 B2 | 10/2011 | Piehler et al. |
| 8,037,453 B1 | 10/2011 | Zawadzki |
| 8,069,435 B1 | 11/2011 | Lai |
| 8,104,018 B2 | 1/2012 | Chessell et al. |
| 8,112,814 B2 | 2/2012 | Shimizu |
| 8,347,263 B1 | 1/2013 | Offer |
| 8,407,669 B2 | 3/2013 | Yee et al. |
| 8,429,708 B1 | 4/2013 | Tandon |
| 8,458,646 B2 | 6/2013 | Knutson et al. |
| 8,566,779 B2 | 10/2013 | Sukhenko et al. |
| 8,577,937 B1 | 11/2013 | Offer |
| 8,645,341 B2 | 2/2014 | Salman et al. |
| 8,645,907 B2 | 2/2014 | Jain et al. |
| 8,701,078 B1 | 4/2014 | Holler et al. |
| 8,707,248 B2 | 4/2014 | Sawant et al. |
| 8,875,088 B1 | 10/2014 | Holler et al. |
| 2001/0013024 A1 | 8/2001 | Takahashi et al. |
| 2002/0016953 A1 | 2/2002 | Sollich |
| 2002/0111808 A1 | 8/2002 | Feinberg |
| 2002/0149614 A1 | 10/2002 | Biebesheimer et al. |
| 2002/0165912 A1* | 11/2002 | Wenocur et al. ............ 709/203 |
| 2002/0178360 A1* | 11/2002 | Wenocur et al. ............ 713/170 |
| 2002/0194483 A1* | 12/2002 | Wenocur et al. ............ 713/185 |
| 2002/0194501 A1* | 12/2002 | Wenocur et al. ............ 713/201 |
| 2002/0199001 A1* | 12/2002 | Wenocur et al. ............ 713/200 |
| 2002/0199096 A1* | 12/2002 | Wenocur et al. ............ 713/153 |
| 2003/0009694 A1* | 1/2003 | Wenocur et al. ............ 713/201 |
| 2003/0041110 A1* | 2/2003 | Wenocur et al. ............ 709/206 |
| 2003/0056173 A1 | 3/2003 | Copenhaver et al. |
| 2003/0093716 A1 | 5/2003 | Farchi et al. |
| 2003/0121011 A1 | 6/2003 | Carter |
| 2004/0025166 A1 | 2/2004 | Adlung et al. |
| 2004/0143811 A1 | 7/2004 | Kaelicke et al. |
| 2004/0204970 A1 | 10/2004 | Boden et al. |
| 2005/0039045 A1 | 2/2005 | Wheeler |
| 2005/0044197 A1 | 2/2005 | Lai |
| 2005/0055399 A1 | 3/2005 | Savchuk |
| 2005/0114331 A1 | 5/2005 | Wang et al. |
| 2005/0114771 A1 | 5/2005 | Piehler et al. |
| 2005/0114830 A1 | 5/2005 | Knutson et al. |
| 2005/0144529 A1 | 6/2005 | Gotz et al. |
| 2005/0160405 A1 | 7/2005 | Lunia et al. |
| 2006/0036935 A1 | 2/2006 | Warner et al. |
| 2006/0150200 A1* | 7/2006 | Cohen et al. .................. 719/328 |
| 2006/0230410 A1 | 10/2006 | Kurganov et al. |
| 2006/0287959 A1 | 12/2006 | Blecken |
| 2007/0005300 A1 | 1/2007 | Haggerty et al. |
| 2007/0006160 A1 | 1/2007 | Kunz et al. |
| 2007/0156693 A1 | 7/2007 | Soin et al. |
| 2007/0168918 A1 | 7/2007 | Metherall et al. |
| 2007/0250815 A1 | 10/2007 | Bendapudi et al. |
| 2008/0027742 A1 | 1/2008 | Maeda |
| 2008/0066071 A1 | 3/2008 | Jain et al. |
| 2008/0102422 A1 | 5/2008 | Hayes et al. |
| 2008/0120602 A1 | 5/2008 | Comstock et al. |
| 2008/0148253 A1 | 6/2008 | Badwe et al. |
| 2008/0229278 A1 | 9/2008 | Liu et al. |
| 2008/0244557 A1 | 10/2008 | Yeung et al. |
| 2008/0263505 A1 | 10/2008 | StClair et al. |
| 2008/0270981 A1 | 10/2008 | Hutchison et al. |
| 2009/0031286 A1 | 1/2009 | Yee et al. |
| 2009/0037912 A1 | 2/2009 | Stoitsev et al. |
| 2009/0119779 A1 | 5/2009 | Dean et al. |
| 2009/0259985 A1 | 10/2009 | Knutson et al. |
| 2009/0271319 A1 | 10/2009 | Bromley et al. |
| 2009/0271760 A1 | 10/2009 | Ellinger |
| 2010/0169862 A1 | 7/2010 | Wolf et al. |
| 2010/0180258 A1 | 7/2010 | Takahashi |
| 2010/0228683 A1 | 9/2010 | Ansley et al. |
| 2010/0251379 A1 | 9/2010 | Myers et al. |
| 2010/0269095 A1 | 10/2010 | King et al. |
| 2010/0313179 A1 | 12/2010 | Groves et al. |
| 2011/0066420 A1 | 3/2011 | Bassin et al. |
| 2011/0088014 A1 | 4/2011 | Becker et al. |
| 2011/0131134 A1 | 6/2011 | Ferris et al. |
| 2011/0131315 A1 | 6/2011 | Ferris et al. |
| 2011/0138358 A1 | 6/2011 | Rau et al. |
| 2011/0154378 A1 | 6/2011 | Kishan et al. |
| 2011/0239227 A1 | 9/2011 | Schaefer et al. |
| 2011/0246540 A1 | 10/2011 | Salman et al. |
| 2011/0264649 A1 | 10/2011 | Hsiao et al. |
| 2011/0295701 A1 | 12/2011 | Phan |
| 2012/0005209 A1* | 1/2012 | Rinearson et al. ............ 707/737 |
| 2012/0005692 A1 | 1/2012 | Bulko et al. |
| 2012/0011455 A1 | 1/2012 | Subramanian et al. |
| 2012/0054250 A1 | 3/2012 | Williams et al. |
| 2012/0158527 A1* | 6/2012 | Cannelongo et al. ......... 707/748 |
| 2012/0158669 A1 | 6/2012 | Morsi et al. |
| 2012/0159441 A1 | 6/2012 | Ghaisas |
| 2012/0174194 A1 | 7/2012 | Furukawa |
| 2012/0210243 A1 | 8/2012 | Uhma et al. |
| 2012/0246609 A1 | 9/2012 | Boden et al. |
| 2012/0246611 A1* | 9/2012 | Sawant et al. ................. 717/104 |
| 2012/0291010 A1 | 11/2012 | Hutchison et al. |
| 2012/0304248 A1 | 11/2012 | Watts et al. |
| 2012/0311003 A1 | 12/2012 | Kuznetsov et al. |
| 2013/0024847 A1 | 1/2013 | Browne et al. |
| 2013/0061200 A1 | 3/2013 | Roberts et al. |
| 2013/0216205 A1 | 8/2013 | Suri et al. |
| 2013/0326637 A1 | 12/2013 | Fang et al. |
| 2014/0013440 A1 | 1/2014 | Thakur et al. |
| 2014/0053127 A1 | 2/2014 | Madison et al. |
| 2014/0123107 A1* | 5/2014 | Rajagopalan ................. 717/123 |
| 2014/0201704 A1 | 7/2014 | Boden et al. |
| 2015/0020053 A1 | 1/2015 | Boden et al. |

OTHER PUBLICATIONS

Anonymous, "Standardization for the Configuration of Heterogeneous Platforms Through Shema-Based Platform Tag Definitions", IP.com IPCOM000020720D, Dec. 10, 2003, pp. 1-5.

Huaikou Miao et al., "An Approach to Generating Test Cases for Testing Component-based Web Applications,"; Workshop on Intelligent Information Technology Application, Dec. 2-3, 2007, p. 264-269.

IBM, "Method and System for Dynamically Unloading and Loading Software Applications from a Peer-to-Peer Platform", IP.com IPCOM000193302D, Feb. 18, 2010, pp. 1-3.

International Search Report and Written Opinion: International Application No. PCT/IB2014/058076, International filing date: Jan. 6, 2014; Date of mailing Apr. 21, 2014; 10 PGS.

L. Chung et al., "On Non-Functional Requirements in Software Engineering," Lecture Notes in Computer Science, v.5600, pp. 363-379, 2009.

Wei Yu, "Refactoring Use Case Models on Episodes," Thesis, Dept. of Computer Science, Concordia Univ., Montreal, Quebec, Mar. 2004; 97 pgs.

(56) References Cited

OTHER PUBLICATIONS

Yara, P, et al. "Global Software Development with Cloud Platforms", Gotel, O. et al. (eds): Seafood 2009, LNBIP 35, pp. 81-95, 2009.

European Examination Report for Application No. EP10776347.6-1957, dated Oct. 3, 2014, 6 pgs.

Leffingwell, "A Rally Software Development Corporation Whitepaper—Agile Software Development with Verification and Validation in . . . "; 2011, [retrieved Feb. 3, 2015]; retrieved fm internet <URL:http://www.ultertechnologies.com/docs/agile.pdf> 33 pgs.

* cited by examiner

AUTOMATED DATA COLLECTION, COMPUTATION AND REPORTING OF CONTENT SPACE COVERAGE METRICS FOR SOFTWARE PRODUCTS

DOMESTIC PRIORITY

This application is a continuation application of the legally related U.S. Ser. No. 13/741,791 filed Jan. 15, 2013, the contents of which are incorporated by reference herein in their entirety.

BACKGROUND

This invention relates generally to processing within a computing environment, and more particularly to automated data collection, computation and reporting of content space coverage metrics for software products.

A new metric is being adopted to help measure the completeness and effectiveness of software product testing, test automation, Functional Verification Testing (FVT) and System Verification Testing (SVT). This metric is called "content coverage" in short-hand form. A full name would be "content space coverage." It is based on the idea and processes concerning (software product) content spaces. The term "content coverage" is meant to convey parallels and analogs with the "code coverage" metrics. These two coverage metrics express what percentage of an underlying measurement basis has been tested, or tested successfully, or failed, etc. The basis for code coverage is the code itself, at varying levels of detail (e.g., class, entry point, block, line of code). The basis for content coverage is the content space for the software product (or component), at varying levels of detail (noun group, noun, verb, interface, platform, requirement, etc.)

SUMMARY

An embodiment includes a computer implemented method. The method includes receiving one or more test results and one or more user stories. For each test result in the one or more test results a set of content space coordinates of the one or more test results is compared to a set of content space coordinates of the one or more user stories. Based on the comparison it is determined if one or more user stories have been tested. One or more results of the comparison are then stored.

Yet another embodiment includes a computer program product. The computer program product includes a tangible storage medium readable by a processing circuit and storing instructions for execution by the processing circuit for performing a method. The method includes receiving one or more test results and one or more user stories. For each test result in the one or more test results a set of content space coordinates of the one or more test results is compared to a set of content space coordinates of the one or more user stories. Based on the comparison it is determined if one or more user stories have been tested. One or more results of the comparison are then stored.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
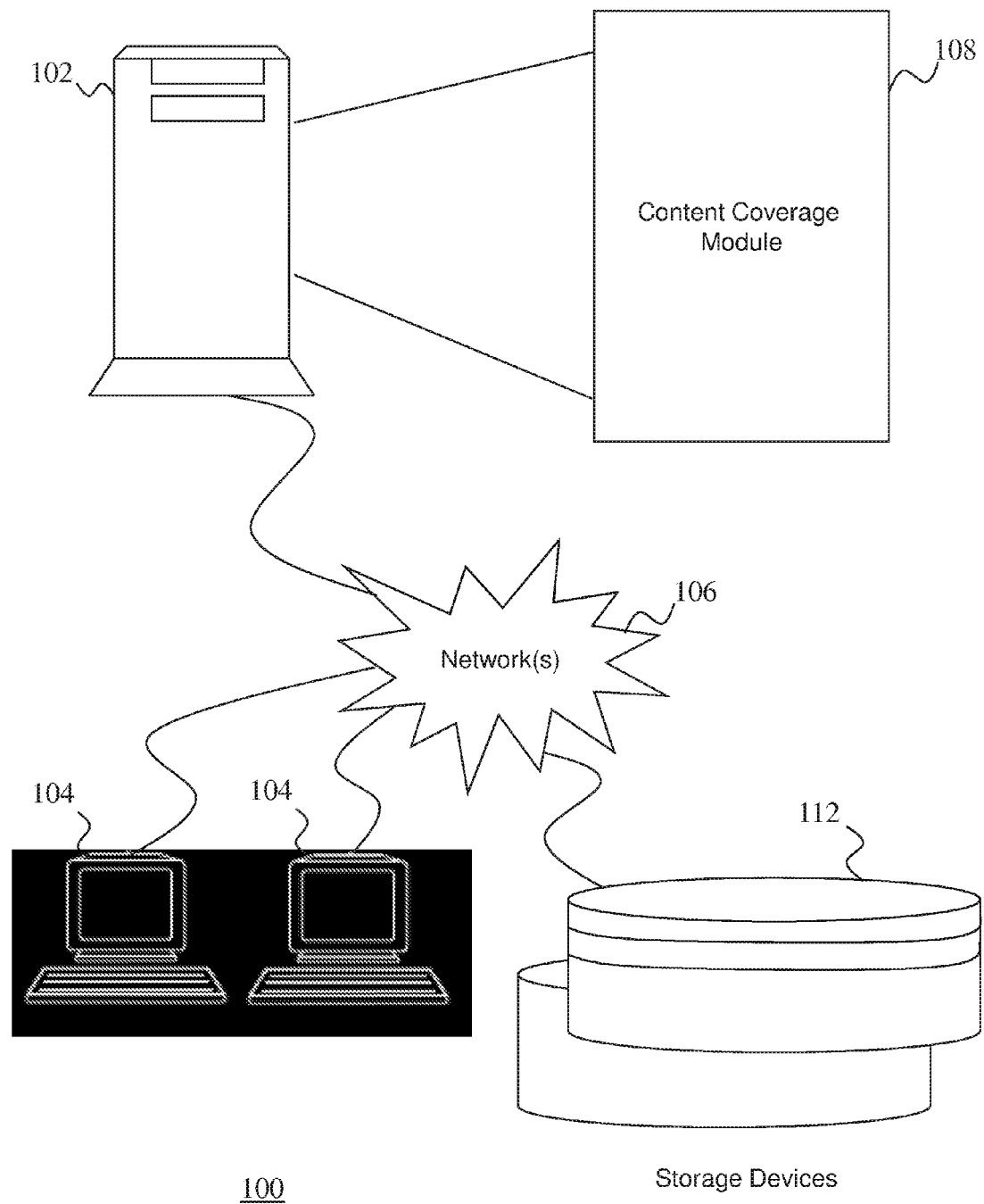
FIG. 1 depicts a schematic diagram of a system for automated data collection, computation, and reporting of content space coverage metrics that may be implemented by an embodiment.

An embodiment of the present invention provides for automated data collection, computation and reporting of content space coverage metrics for software products.

A test automation framework includes the capability to associate a test case with a set of content space coordinate values that represent a content space. The content space is a way of representing software content from an outside-in perspective via a set of dimensions. Each of the content space dimensions has values defined in terms of the software itself that concern a particular aspect, such as information abstraction, function, external interface and run-time environment. The dimension values can represent existing content and also new content for the software based on requirements (via content space analysis). The content space can be programmatically traversed, and as this traversal occurs, end-to-end testable units (termed user stories) are output, each corresponding to a particular and identified region of the content space. The set of all output user stories partitions the software content. The set of all user stories and various subsets (e.g. all Power user stories) are used to compute the content coverage metric of various scopes.

The content space coordinate values correlate with a set of business requirements for software under measurement (also referred to herein as an "application") and for various platforms that the application is developed to execute on. In an embodiment, an application is a defined scope of software, such as a software product, an operating system, a software component of a larger software suite, an end-user application, a web server, a database application, etc. In other embodiments, an application is any software component, the boundary of which is determined by the provider of the software development requirements. The content space coordinates for the tests are output by each test as it executes and collected and reported along with test case execution results. The test results are automatically combined with the full set, or a subset, of user stories. The user stories are generated from the content space for the product release or application that is being tested, and each user story has the content space coordinates for the region it represents. These coordinates are retained in the information comprising the user story. The user stories are testable units of functionality derived from the business requirements. The user stories may include only a single function of the application, or may include multiple interrelated functions, hence sizes of user stories may vary. The resulting content coverage metric is calculated as a ratio of the number user stories tested (from the test results) over the total number of user stories in application, and reported (i.e., via web pages, data files, database, etc.).

Code coverage is a measure of the amount of source code (i.e., lines of code, modules, etc.) that was tested by a set of test cases. Content coverage similarly measures the part of an application (and/or a body of code) that has been tested by a set of test cases; however, content coverage is directed to the amount of a set of business requirements and prior release functionality that has been tested by the test, as measured by user stories generated from the application content space. Testing based on content, i.e., business requirement testing, provides a link between the tested application and the set of requirements that were used as the "blue print" for the application itself. Once the content coverage can be determined, the thoroughness of the set of test cases may be determined.

While code coverage is expressed in lines of code, classes, method, etc., content coverage is expressed in terms of a verb (i.e., a function), a noun (i.e., the thing the function is operating on), one or more interfaces (i.e., a graphical user interface (GUI), the command line, a web service, etc.), and the platform the application is executing on (i.e., the operating system, the hardware, etc.).

Content coverage is useful; however, without automation of the content coverage data, it is of little practical use. Raw data is collected during testing. The resulting data is automatically related to the underlying content space for which the tests have been executed against to allow computation of the metric itself. Then the results are automatically reported with various splits (overall, per platform, per requirement, per license, per noun and verb combination, etc.).

Turning now to FIG. 1, a system 100 for implementing automated data collection, computation, and reporting of content space coverage metrics will now be described. In an embodiment, the system 100 includes a host system computer 102 executing computer instructions for implementing automated data collection, computation, and reporting of content space coverage metrics. Host system computer 102 may operate in any type of environment that is capable of executing a software application. Host system computer 102 may comprise a high-speed computer processing device, such as a mainframe computer, to manage the volume of operations governed by an entity for which the automated data collection, computation, and reporting of content space coverage metrics system is executing. In an embodiment, the host system computer 102 is part of an enterprise (e.g., a commercial business) that implements the automated data collection, computation, and reporting of content space coverage metrics.

In an embodiment, the system 100 depicted in FIG. 1 includes one or more client systems 104 through which users at one or more geographic locations may contact the host system computer 102. The client systems 104 are coupled to the host system computer 102 via one or more networks 106. Each client system 104 may be implemented using a general-purpose computer executing a computer program for carrying out the processes described herein. The client systems 104 may be personal computers (e.g., a lap top, a personal digital assistant, a mobile device) or host attached terminals. If the client systems 104 are personal computers, the processing described herein may be shared by a client system 104 and the host system computer 102 (e.g., by providing an applet to the client system 104). Client systems 104 may be operated by authorized users (e.g., programmers) of the automated data collection, computation, and reporting of content space coverage metrics system described herein.

The networks 106 may be any type of known network including, but not limited to, a wide area network (WAN), a local area network (LAN), a global network (e.g., Internet), a virtual private network (VPN), and an intranet. The networks 106 may be implemented using a wireless network or any kind of physical network implementation known in the art. A client system 104 may be coupled to the host system computer 102 through multiple networks (e.g., intranet and Internet) so that not all client systems 104 are coupled to the host system computer 102 through the same network. One or more of the client systems 104 and the host system computer 102 may be connected to the networks 106 in a wireless fashion. In one embodiment, the networks 106 include an intranet and one or more client systems 104 executing a user interface application (e.g., a web browser) to contact the host system computer 102 through the networks 106. In another embodiment, the client system 104 is connected directly (i.e., not through the networks 106) to the host system computer 102 and the host system computer 102 contains memory for storing data in support of automated data collection, computation, and reporting of content space coverage metrics. Alternatively, a separate storage device (e.g., storage device 112) may be implemented for this purpose.

In an embodiment, the storage device 112 includes a data repository with data relating to the automated data collection, computation, and reporting of content space coverage metrics by the system 100, as well as other data/information desired by the entity representing the host system computer 102 of FIG. 1. The storage device 112 is logically addressable as a consolidated data source across a distributed environment that includes networks 106. Information stored in the storage device 112 may be retrieved and manipulated via the host system computer 102 and/or the client systems 104. In an embodiment, the storage device 112 includes one or more databases containing, e.g., automated data collection, computation, and reporting of content space coverage metrics system data and corresponding configuration parameters, values, methods, and properties, as well as other related information as will be discussed more fully below. It will be understood by those of ordinary skill in the art that the storage device 112 may also comprise other structures, such as an XML file on the file system or distributed over a network (e.g., one of networks 106), or from a data stream from another server located on a network 106. In addition, all or a portion of the storage device 112 may alternatively be located on a client system 104.

The host system computer 102 depicted in the system of FIG. 1 may be implemented using one or more servers operating in response to a computer program stored in a storage medium accessible by the server. The host system computer 102 may operate as a network server (e.g., a web server) to communicate with the client systems 104. The host system computer 102 handles sending and receiving information to and from the client systems 104 and can perform associated tasks. The host system computer 102 may also include a firewall to prevent unauthorized access to the host system computer 102 and enforce any limitations on authorized access. For instance, an administrator may have access to the entire system and have authority to modify portions of the system. A firewall may be implemented using conventional hardware and/or software as is known in the art.

The host system computer 102 may also operate as an application server. The host system computer 102 executes one or more computer programs to provide the automated data collection, computation, and reporting of content space coverage metrics. The host system computer 102 includes a content coverage module 108. As indicated above, processing may be shared by the client systems 104 and the host system computer 102 by providing an application (e.g., java applet) to the client systems 104. Alternatively, the client system 104 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions. In an embodiment, the automated data collection, computation, and reporting of content space coverage metrics system executes on the same host computer system that executes the application that is being tested. In other embodiments, the automated data collection, computation, and reporting of content space coverage metrics system is executed on a separate computer system from the application that is being tested.

It will be understood that the automated data collection, computation, and reporting of content space coverage metrics system described in FIG. 1 may be implemented in hardware, software executing on a general purpose computer, or a combination thereof.

Figure 2:
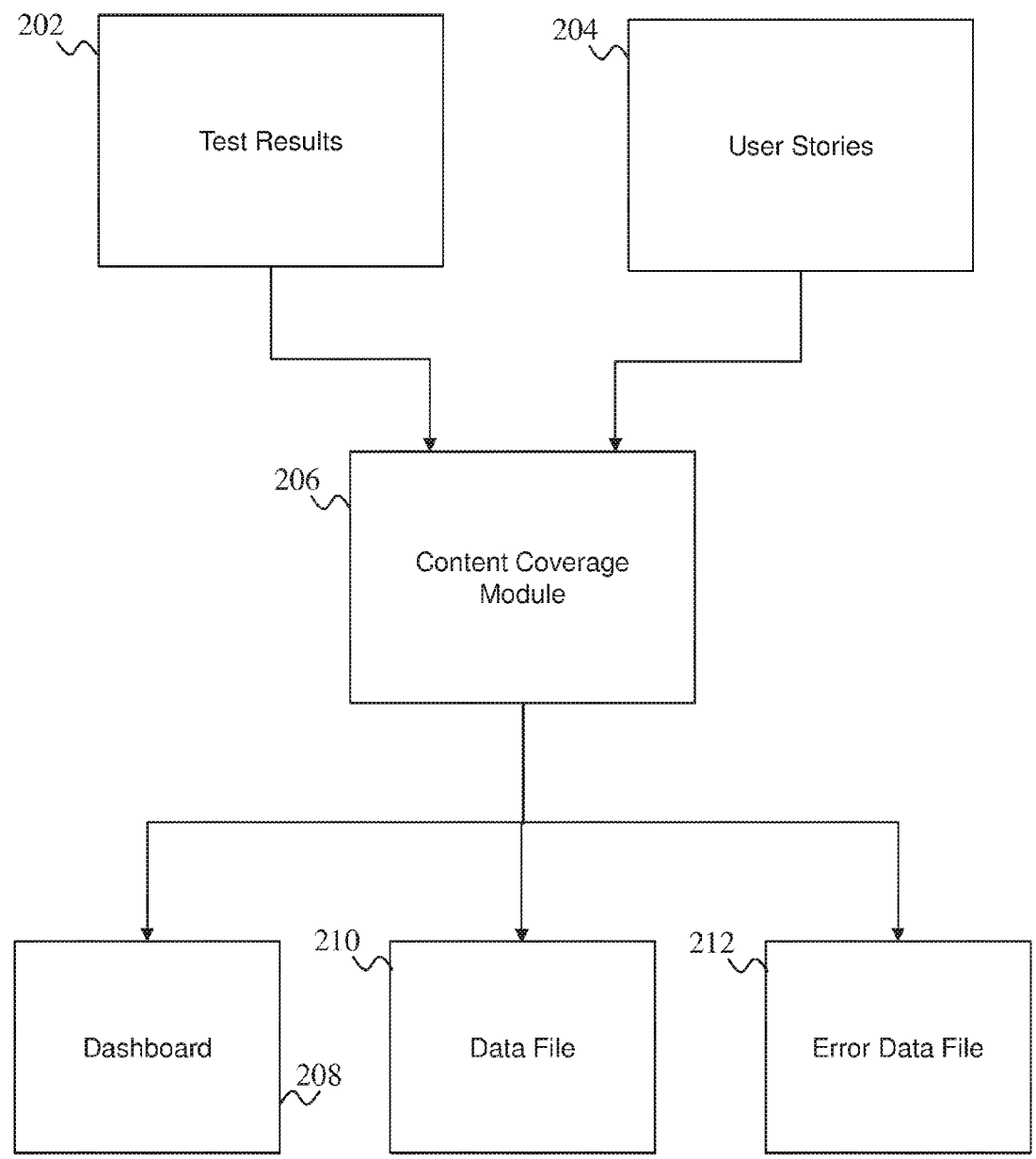
FIG. 2 depicts a schematic diagram of a content coverage module in an embodiment.

FIG. 2 depicts a schematic diagram of a content coverage module in an embodiment. In an embodiment, the content coverage module 206 executes on the host system computer 102 of FIG. 1. The content coverage module 206 receives data and generates output In an embodiment the content coverage module 206 receives a set of test results 202, and data representing a set or subset of business requirements for an application. In an embodiment, the data representing the application is a set of user stories 204. The user stories 204 are based on a set of user requirements and prior release content that are implemented in the software or application under test.

In an embodiment, the set of requirements is partitioned into one or more user stories. In an embodiment, the full set of user stories represents the entirety of the business requirements with no gaps. In addition, no two user stories will overlap (i.e. represent the same business requirement) and some user stories are impacted by multiple requirements. The user stories 204 are generated from the business requirements. In an embodiment, the user stories 204 are automatically generated from the business requirements, using an automated system, and are stored in, for example, a file or a database. The user stories 204 that are planned for a given release are then passed to the content coverage module 206. In an embodiment, a subset of the total user stories may be used to compute content coverage. The user stories 204 may be supplied in a single file or in multiple files.

In an embodiment, the test results 202 are generated as a result of executing one or more test cases. Test cases are user defined as automated or manual tests. The test cases are executed to test a particular aspect of the application to ensure that the application is functioning as specified in the business requirements. When the tests are executed, either manually or using an automated testing system, the results of the tests (i.e., passed, failed, etc.) are collected and recorded. The results include content space coordinate values which indicate which regions of the content space the test has tested. The test results 202 are correlated back to the test cases so that the reports will indicate which tests succeeded and which failed. The test results 202 may be supplied in a single file or in multiple files. In an embodiment, the test results 202 include an indicator to identify if the test was executed manually or if the test was executed automatically.

The test cases are also correlated to the user stories 204. In an embodiment, the test cases are correlated to the user stories 204 using a test case meta file. The test case meta file includes the name of the test case as well as a set of content space coordinates. The set of content space coordinates matches coordinates associated with one or more of the user stories 204. In an embodiment, the content space coordinates include a verb. The verb indicates the function that is being described in the user story, and/or the function that is being tested by the test case. For example, in an application such as a web browser, one function that may be tested is the download of a file. In this case the verb is "download." The content space coordinates also include a noun. The noun is the object of the verb. Therefore, for a download verb, the noun may be "file." The content space coordinates also include an interface. The interface is the method of accessing the verb. For a browser the interface may be a GUI. Other interfaces, such as command line, web service, etc. may be used both in the user stories, and in the test cases. In addition, the content space coordinates include a platform. The platform is the operating system and/or the hardware that the application is executing on. Both the user story and the test case may specify one or more platforms. In other embodiment, other properties may be included in the content space coordinates in order to add more granularity to the test cases and/or user stories as would be understood by those of ordinary skill in the art.

The test case meta file is created as a bridge between the test cases and the user stories 204. In an embodiment the test case meta file is a json file including a content-space segment such as:

```
{...
    "cs": ["noun":"file", "verb":"copy", "interface":"CLI",
    "platform":"UNIX"]
...}
```

It will be understood that the json representation of the content space coordinates is only one example provided for purposes of clarity and that, in other embodiments, any method for representing the content space coordinates may be used. Although the example described above uses a single value to represent each of the content space coordinates, it will be understood that in embodiments multiple nouns, verbs, interfaces, and platforms may be specified for a single test case and/or user story. Furthermore, any of the values may be represented by a wildcard character indicating that it is applicable to all values.

When the test case is executed, the results of the test are stored along with the content space coordinates associated to the test case. These results are fed to the content coverage module 206 as test results 202. The content coverage module 206 matches the content space coordinates in the test results 202 with the content space coordinates in the user stories 204, and then generates the results of the match. In an embodiment, the generated data is fed to a dashboard 208, and/or a data file 210. The dashboard 208 includes a hyper-text markup language (HTML) page viewable in a web browser, or a set of data that is viewable in a GUI application. In an embodiment, the data file 210 is a comma separate value (CSV) file, a text file, or a database. In an embodiment, a dashboard 208 is generated from the data file 210 instead of, or along with, being generated as a direct output of the content coverage module 206. In an embodiment, an error, such as an error matching the content space coordinates of a test case to a user story, is saved in an error data file 212. In an embodiment, the dashboard 208 includes a link or URL that allows a user to download the error data file 212.

Figure 3:
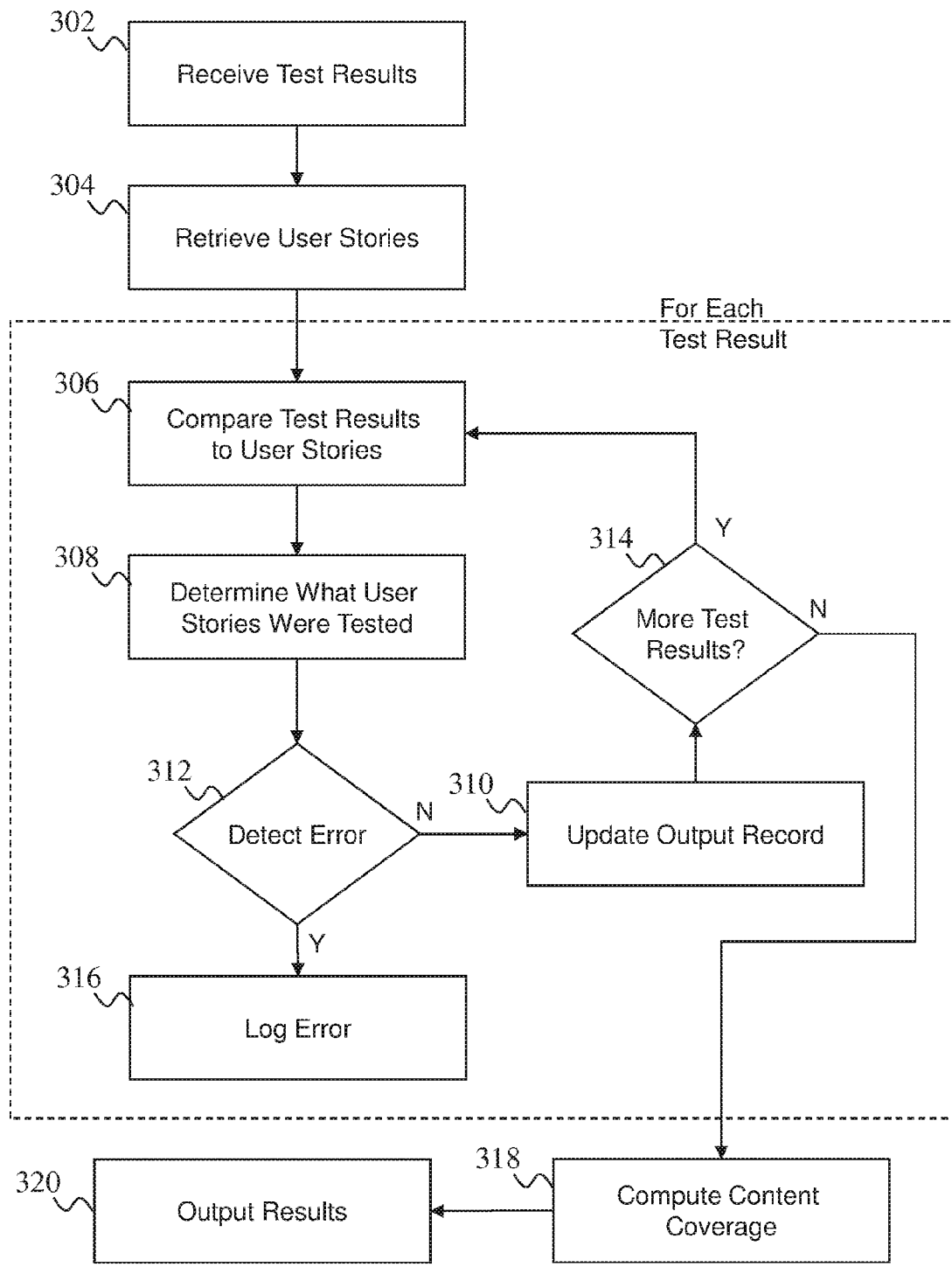
FIG. 3 depicts a process flow for automated data collection, computation, and reporting of content space coverage metrics.

FIG. 3 depicts a process flow for automated data collection, computation, and reporting of content space coverage metrics. In an embodiment, the process flow of FIG. 3 is executed by the content coverage module 108 of FIG. 1. At block 302, a set of test results is received. The test results include content space coordinates corresponding to the test cases that were executed. At block 304, all of the user stories are retrieved. The user stories may be retrieved from a file on a file system, a database, a web service, or other storage locations and methods as is known in the art. At block 306 the test result is compared to the user story using the content space coordinates of each. In an embodiment, the coordinates may represent multiple sets of coordinates as stated above. At block 308, the user stories that were tested are determined based on the comparison. At block 312, it is determined if any errors were detected. In an embodiment, an error may occur if only some of the coordinates were matched (i.e., fewer than 4 coordinates were matched), if there was no match for a valid test coordinate, it there was no match at all, or if there are multiple conflicting matches to the coordinates. If there was at least one good match, then processing continues at block 310, where the output data is updated to reflect the user stories that were tested, as well as the results of the test. At block 314, it is determined if there are more tests results to process. If there are more test results to process, then processing continues at block 306, and blocks 306-316 are processed for each of the remaining test results. Otherwise, if there are no more test results, then at block 318, a content coverage value is computed. In an embodiment, the content coverage is computed as a percentage by dividing the tested user stories, as determined by the content coverage module, by the total number of user stories, as determined by the retrieved user stories. The results of the computing as well as the results of the comparison of the test results to the user stories are output at block 320.

In an embodiment, the results of the computing as well as the results of the comparison of the test results to the user stories are output directly to a dashboard, such as the dashboard 208 of FIG. 2. The dashboard may include various automated visualizations of overall test results, for example in the form of a tree map. In an additional embodiment, the output is sent to an output file or database, such as the data file 210 of FIG. 2. In yet another embodiment the results are output to both a dashboard, and an output file. The output may also include an error file, such as the error data file 212 of FIG. 2.

Returning to block 312, if at least one error is detected, the error is logged in an error file. In an embodiment the error is logged to a database. It will be understood that the content space coordinates may reference multiple nouns, verbs, interfaces, and platforms, and therefore, in an embodiment, multiple user stories may match a single test result. Furthermore, it is possible that multiple combinations of the content space coordinates may not match any user stories and therefore may result in multiple errors. In addition, an error may be found while at the same time a valid match is also found resulting in both one or more entries in the error log, as well as one or more entries in the output record.

Technical effects and benefits include providing a consistent, simple, cross-product and cross-release metric of the completeness and other quality aspects of a broad range of testing. This new metric has the additional advantage of directly relating user requirements, use cases and similar software product elements of stakeholder to business value. The computational basis for the metric is meaningful, realistic and inherently tied to business value. A further benefit is that consistent content coverage metrics are automatically computed and compared for new function and prior release functionality. An additional benefit is that consistent content coverage metrics are automatically computed and compared across supported platform environments. Further benefits include that content coverage is tracked across sprint (iterations) and releases for reasonable and realistic improvements. Yet another benefit is that test completeness is automatically measured and reported with various break downs (e.g. by requirement, by platform, by noun, etc.). A further benefit is that end-to-end automation allows very low overhead and frequent update of content coverage metrics.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method, comprising:
   receiving one or more test results;
   receiving one or more user stories;
   for each test result in the one or more test results performing:
      comparing, on a computer, a set of content space coordinates of the one or more test results to a set of content space coordinates of the one or more user stories; and
      determining, on the computer, if one or more user stories have been tested responsive to the comparing;
      storing one or more results of the determining; and
      calculating content coverage of the one or more test results by dividing the tested user stories by a count of the one or more user stories.

2. The method of claim 1, wherein the set of content space coordinates comprises a verb and a noun.

3. The method of claim 2, wherein the set of content space coordinates further comprises an interface and a platform.

4. The method of claim 3, wherein one or more of the interface and the platform comprise a value that includes all possible values.

5. The method of claim 3, wherein one or more of the noun, the verb, the interface, and the platform comprise multiple values.

6. The method of claim 1, wherein the one or more results of the determining are displayed in a dashboard.

7. A computer program product, comprising:
   a non-transitory tangible storage medium readable by a processing circuit and storing instructions for execution by the processing circuit for performing a method comprising:

receiving one or more test results;
receiving one or more user stories;
for each test result in the one or more test results performing:
- comparing a set of content space coordinates of the one or more test results to a set of content space coordinates of the one or more user stories; and
- determining if one or more user stories have been tested responsive to the comparing;
- storing one or more results of the determining; and
- calculating content coverage of the one or more test results by dividing the tested user stories by a count of the one or more user stories.

8. The computer program product of claim 7, wherein the set of content space coordinates comprises a verb and a noun.

9. The computer program product of claim 8, wherein the set of content space coordinates further comprises an interface, and a platform.

10. The computer program product of claim 9, wherein one or more of the interface and the platform comprise a value that includes all possible values.

11. The computer program product of claim 9, wherein one or more of the noun, the verb, the interface, and the platform comprise multiple values.

12. The computer program product of claim 7, wherein the one or more results of the determining are displayed in a dashboard.

* * * * *